3,010,949
COPOLYMERS OF 3-METHYL-1-BUTENE AND 3-METHYL-1-PENTENE

John A. Price, Swarthmore, Pa., assignor to American Viscose Corporation, Philadelphia, Pa., a corporation of Delaware
No Drawing. Filed Apr. 26, 1960, Ser. No. 24,665
3 Claims. (Cl. 260—88.2)

This invention relates to new compositions of matter and more particularly to copolymers of 3-methyl-1-butene and 3-methyl-1-pentene.

In the recent past there has developed a pressing need for heat resistant plastic materials for aircraft, missiles, and space vehicles. Such materials must hold their strength and other physical properties at temperatures in excess of 400° F. In the case of crystalline polyolefins, this requires that their crystalline melting range be in excess of 500° F., since the physical properties, such as tensile strength and stiffness, of a polyolefin deteriorate rapidly as the crystalline melting range is approached. On the other hand, as the crystalline melting range increases in temperature, so does the difficulty in fabricating the polymer. Consequently if a plastic article is to be subjected to an environment in which the maximum temperature to be encountered is 400° F., the optimum crystalline melting range of the polymer would be about 500° F., since it is high enough to provide adequate strength at 400° F., and the polymer is more processable than one having a higher crystalline melting range. Similarly, if the maximum service temperature is to be 450° F., the polymer should exhibit a crystalline melting in the neighborhood of 550° F., and if the service temperature is 500° F. the optimum melting range is about 600° F.

It is an object of this invention to provide a family of heat-resistant thermoplastic olefin polymers having crystalline melting ranges from about 525° F. to about 670° F., which may be fabricated into articles such as mouldings, films, and fibers which are resistant to temperatures in the range of 400° F. to 580° F., and which may be selected for maximum processability depending on the service temperature to which the articles are to be subjected.

I have found that the foregoing object may be attained by copolymerizing 3-methyl-1-butene and 3-methyl-1-pentene, in the presence of a coordination complex catalyst, in molar proportions of 9:1 to 1:9, to yield copolymers which are crystalline throughout the range and which have crystalline melting ranges varying from 527–545° F. to 660°–675° F. Furthermore, the copolymers are substantially insoluble in hydrocarbons or other solvents.

By coordination complex catalyst, I mean the complex formed by the interaction of a transition metal halide and a metal alkyl or alkyl halide. Particularly useful complexes are titanium tetrachloride-aluminum triisobutyl, titanium trichloride-aluminum triethyl, vanadium trichloride-aluminum diethyl chloride, vanadium tetrachloride-aluminum triisopropyl, and other complexes of titanium or vanadium chlorides with aluminum alkyls or alkyl chlorides. By crystalline melting range, I mean the temperature range over which birefringence disappears when the polymer is viewed through a polarizing microscope. Melting ranges determined by this method are not strictly reproducible and may vary 10° to 15° from sample to sample.

The polymerization is preferably carried out in the absence of oxygen or moisture and in the presence of an inert hydrocarbon reaction medium such as hexane, heptane, or octane, and at temperatures ranging from room temperature to 250° F., but preferably at 160–180° F. At the completion of the polymerization reaction the catalyst is deactivated by the addition of a polar material such as an alcohol or acetone, and the solid polymer is recovered by filtration or centrifugation. The polymer, which is in powder form when recovered from the reactor, may then be extruded into pellets for storage prior to further processing. If desired, stabilizing materials may be added to the powder prior to extrusion.

EXAMPLE I

Oven dried pressure bottles equipped with magnetic stirrers and addition funnels were purged with nitrogen and charged with 50 ml. of dry heptane. This was followed by the injection of 1.0 ml. of titanium tetrachloride and 2.5 ml. of aluminum triisobutyl. After stirring for 10 minutes, the brown catalyst slurries were cooled in an ice bath, and about 15 grams of chilled mixtures of 3-methyl-1-butene and 3-methyl-1-pentene were dripped into the bottles. The mixtures were of varying proportions of the two monomers ranging from 90% 3-methyl-1-butene to 90% 3-methyl-1-pentene. The funnels were then removed, and the bottles were sealed and placed in an oil bath at 160° F. The bottles were maintained under these conditions with magnetic stirring for 48 hours.

The bottles were then cooled and about 10 ml. of a 1:1 mixture of methanol and isopropanol was added to the cooled slurries. The slurries were then poured into beakers containing 250 ml. of the 1:1 alcohol mixture. The polymers were collected on sintered glass funnels and washed successively with cold isopropanol, hot isopropanol, and methanol. The polymers were initially air-dried and finally dried in a vacuum oven overnight at 130° F. Polymer yields varied between 28 and 52%. Samples of the polymers were extracted with refluxing heptane for 8 hour periods, and it was found that only from 8 to 14% of the polymers were soluble in the heptane. They were also substantially insoluble in decahydronphthalene at 135° C. X-ray analysis of the polymer powders showed a high degree of crystallinity in all cases, the diffraction patterns changing gradually with the composition of the copolymers. The variation in polymer melting range with composition is listed in the following table.

Table I

| 3-methyl-1-butene, mol percent | 3-methyl-1-pentene, mol percent | Melting Range, ° F. |
|---|---|---|
| 10 | 90 | 662–675 |
| 20 | 80 | 617–644 |
| 40 | 60 | 580–595 |
| 60 | 40 | 536–550 |
| 70 | 30 | 534–550 |
| 90 | 10 | 527–545 |

EXAMPLE II

The same general procedure was employed in this example as in Example I. Each bottle was charged with 50 ml. of dry heptane and 1.43 grams of vanadium trichloride and 4.5 ml. of aluminum triisobutyl were added as the catalyst. The polymerizations were run at 176° F. for 24 hours. Polymer yield varied from 62 to 69%, based on the monomers charged. The amount of polymer soluble in refluxing heptane varied from 4 to 10%. X-ray diffraction patterns were similar to those of the polymers obtained in Example I.

The variation in melting range with polymer composition is shown in the following table.

*Table II*

| 3-methyl-1-butene, mol percent | 3-methyl-1-pentene, mol percent | Melting Range, °F. |
|---|---|---|
| 40 | 60 | 590-599 |
| 50 | 50 | 554-570 |
| 60 | 40 | 554-565 |
| 70 | 30 | 540-550 |
| 80 | 20 | 537-547 |
| 90 | 10 | 527-535 |

The following is claimed:

1. A polymerization process which comprises contacting a solution of a mixture of 3-methyl-1-butene and 3-methyl-1-pentene in an inert hydrocarbon solvent with a catalyst consisting of a complex between a compound selected from the group consisting of titanium chlorides and vanadium chlorides and a compound selected from the group consisting of aluminum trialkyls and aluminum dialkyl monochlorides, at a temperature between ambient temperature and 250° F., and recovering a solid polymeric product, the proportion of 3-methyl-1-butene to 3-methyl-1-pentene being from about 9:1 to about 1:9.

2. The process according to claim 1 in which the catalyst is a complex of titanium tetrachloride and aluminum triisobutyl.

3. The process according to claim 1 in which the catalyst is a complex of vanadium trichloride and aluminum triisobutyl.

No references cited.